(12) United States Patent (10) Patent No.: US 12,294,833 B2
Jensen et al. (45) Date of Patent: *May 6, 2025

(54) EAR-WORN ELECTRONIC DEVICE INCORPORATING MICROPHONE FAULT REDUCTION SYSTEM AND METHOD

(71) Applicant: Starkey Laboratories, Inc., Eden Prairie, MN (US)

(72) Inventors: Zac Jensen, Norwood Young America, MN (US); Ryan Chester, Bloomington, MN (US); Brian Dahl, Minnetrista, MN (US); Thomas Scheller, Eden Prairie, MN (US); Joel Erdman, Waconia, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/530,503

(22) Filed: Dec. 6, 2023

(65) Prior Publication Data

US 2024/0107240 A1 Mar. 28, 2024

Related U.S. Application Data

(63) Continuation of application No. 17/553,720, filed on Dec. 16, 2021, now Pat. No. 11,895,465, which is a
(Continued)

(51) Int. Cl.
*H04R 25/00* (2006.01)
*H04R 29/00* (2006.01)
*H04W 4/80* (2018.01)

(52) U.S. Cl.
CPC ......... *H04R 25/405* (2013.01); *H04R 25/305* (2013.01); *H04R 29/005* (2013.01);
(Continued)

(58) Field of Classification Search
CPC .... H04R 25/00; H04R 25/305; H04R 25/405; H04R 2225/51; H04R 2225/55
See application file for complete search history.

(56) References Cited

U.S. PATENT DOCUMENTS

| 4,049,930 A | 9/1977 | Fletcher |
| 7,505,901 B2 | 3/2009 | Kaltenmeier |

(Continued)

FOREIGN PATENT DOCUMENTS

WO WO 00/65873 11/2000

OTHER PUBLICATIONS

International Search Report and Written Opinion from PCT Application No. PCT/US2020/041947 dated Nov. 2, 2020, 14 pages.
(Continued)

*Primary Examiner* — Suhan Ni
(74) *Attorney, Agent, or Firm* — Mueting Raasch Group

(57) ABSTRACT

An ear-worn electronic device comprises a housing configured to be supported by, at, in or on an ear of a wearer. Electronic circuitry is disposed in the housing and comprises a processor. A power source and a receiver or a speaker are respectively disposed in or on the housing. A microphone array is disposed in or on the housing and operatively coupled to the electronic circuitry. The microphone array comprises a plurality of microphones. The processor is configured to operate a set of two or more of the microphones in a directional mode, detect degradation in performance of any microphone of the microphone set, and switch microphone operation from the directional mode to a safe mode using at least one non-degraded microphone of the microphone set in response to detecting the microphone performance degradation.

25 Claims, 8 Drawing Sheets

Related U.S. Application Data continuation of application No. PCT/US2020/041947, filed on Jul. 14, 2020.

(60) Provisional application No. 62/880,941, filed on Jul. 31, 2019.

(52) U.S. Cl.
CPC ...... *H04R 2225/51* (2013.01); *H04R 2225/55* (2013.01); *H04W 4/80* (2018.02)

(56) References Cited

U.S. PATENT DOCUMENTS

| | | | |
|---|---|---|---|
| 8,379,876 | B2 | 2/2013 | Zhang |
| 8,824,692 | B2 | 9/2014 | Sheerin |
| 11,089,419 | B2 | 8/2021 | Neiderberger |
| 11,290,810 | B1 | 3/2022 | Matej |
| 11,632,639 | B2 | 4/2023 | Matej |
| 11,895,465 | B2 * | 2/2024 | Jensen ................ H04R 29/005 |
| 2003/0007647 | A1 | 1/2003 | Nielsen |
| 2003/0198356 | A1 | 10/2003 | Thompson |
| 2004/0165735 | A1 | 8/2004 | Opitz |
| 2004/0202333 | A1 | 10/2004 | Csermak |
| 2005/0041824 | A1 | 2/2005 | Arndt |
| 2010/0189292 | A1 | 7/2010 | Wurzbacher |
| 2011/0015898 | A1 | 1/2011 | Klippel |
| 2011/0058683 | A1 | 3/2011 | Kosteva |
| 2012/0045068 | A1 | 2/2012 | Kim |
| 2015/0230033 | A1 | 8/2015 | Sprague |
| 2015/0326965 | A1 | 11/2015 | Sprague |
| 2016/0112811 | A1 | 4/2016 | Jensen |
| 2018/0262849 | A1 | 9/2018 | Farmani |

OTHER PUBLICATIONS

Madhu, "Low-complexity, robust algorithm for sensor anomaly detection and self-calibration of microphone arrays", *IET* vol. 5, Issue 1, Feb. 2011, p. 97-103. DOI: 10.1049/iet-spr.2009.0164, Print ISSN 1751-9675, Online ISSN 1751-9683.

* cited by examiner

EAR-WORN ELECTRONIC DEVICE INCORPORATING MICROPHONE FAULT REDUCTION SYSTEM AND METHOD

RELATED APPLICATIONS

This application is a continuation of U.S. application Ser. No. 17/553,720, filed Dec. 16, 2021, which is a continuation of PCT Application No. PCT/US2020/041947, filed Jul. 14, 2020, which claims priority to U.S. Provisional Application No. 62/880,941, filed Jul. 31, 2019, the content of which are hereby incorporated by reference in their entireties.

TECHNICAL FIELD

This application relates generally to ear-worn electronic devices, including hearing devices, hearing aids, personal amplification devices, and other hearables, and also relates to other body-worn, consumer, and commercial electronic devices.

BACKGROUND

Hearing devices provide sound for the wearer. Some examples of hearing devices are headsets, hearing aids, speakers, cochlear implants, bone conduction devices, and personal listening devices. Hearing aids, for example, provide amplification to compensate for hearing loss by transmitting amplified sounds to a wearer's ear canals. Hearing devices and various body-worn and consumer electronic devices can include a pair of microphones for converting sound from the environment into electrical signals that can be processed, amplified, and played back to the wearer or user.

Summary

Embodiments are directed to an ear-worn electronic device configured to be worn by a wearer. The ear-worn electronic device comprises a housing configured to be supported by, at, in or on an ear of the wearer. Electronic circuitry is disposed in the housing and comprises a processor. A power source and a receiver or a speaker are respectively disposed in or on the housing. A microphone array is disposed in or on the housing and operatively coupled to the electronic circuitry. The microphone array comprises a plurality of microphones. The processor is configured to operate a set of two or more of the microphones in a directional mode, detect degradation in performance of any microphone of the microphone set, and switch microphone operation from the directional mode to a safe mode using at least one non-degraded microphone of the microphone set in response to detecting the microphone performance degradation.

Embodiments are directed to an ear-worn electronic device configured to be worn by a wearer. The ear-worn electronic device comprises a housing configured to be supported by, at, in or on an ear of the wearer. Electronic circuitry is disposed in the housing and comprises a processor, a radio frequency transceiver, a power source, and a receiver or a speaker. An antenna is disposed in, on, or extending from the housing and operably coupled to the transceiver. A first microphone and a second microphone are respectively disposed in or on the housing and operatively coupled to the electronic circuitry. The processor is configured to operate the first and second microphones in a directional mode, detect degradation in performance of the first and second microphones, and switch from the directional mode to an omnidirectional mode using the non-degraded first or second microphone.

Embodiments are directed to an electronic device comprising a housing and electronic circuitry disposed in the housing and comprising a processor and a power source. A microphone array is disposed in or on the housing and operatively coupled to the electronic circuitry. The microphone array comprises a plurality of microphones. The processor is configured to operate a set of two or more of the microphones in a directional mode, detect degradation in performance of any microphone of the microphone set, and switch microphone operation from the directional mode to a safe mode using at least one non-degraded microphone of the microphone set in response to detecting the microphone performance degradation.

Embodiments are directed to an electronic system comprising an ear-worn electronic device configured to be worn by a wearer and comprising a housing configured to be supported by, at, in or on an ear of the wearer. Electronic circuitry is disposed in the housing and comprises a first processor. A power source and a receiver or a speaker are respectively disposed in or on the housing. A microphone array is disposed in or on the housing and operatively coupled to the electronic circuitry. The microphone array comprises a plurality of microphones. The electronic system also comprises an electronic accessory device comprising a second processor and configured to communicatively couple to the ear-worn electronic device. The first processor, the second processor, or the first and second processors are configured to operate a set of two or more of the microphones in a directional mode, detect degradation in performance of any microphone of the microphone set, and switch microphone operation from the directional mode to a safe mode using at least one non-degraded microphone of the microphone set in response to detecting the microphone performance degradation.

Embodiments are directed to a method implemented by an ear-worn electronic device and an electronic accessory device. The method comprises operating a set of two or more microphones of the ear-worn electronic device in a directional mode, and detecting, by a processor of the ear-worn electronic device or the electronic accessory device, degradation in performance of any microphone of the microphone set. The method also comprises switching microphone operation from the directional mode to a safe mode using at least one non-degraded microphone of the microphone set in response to detecting the microphone performance degradation.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
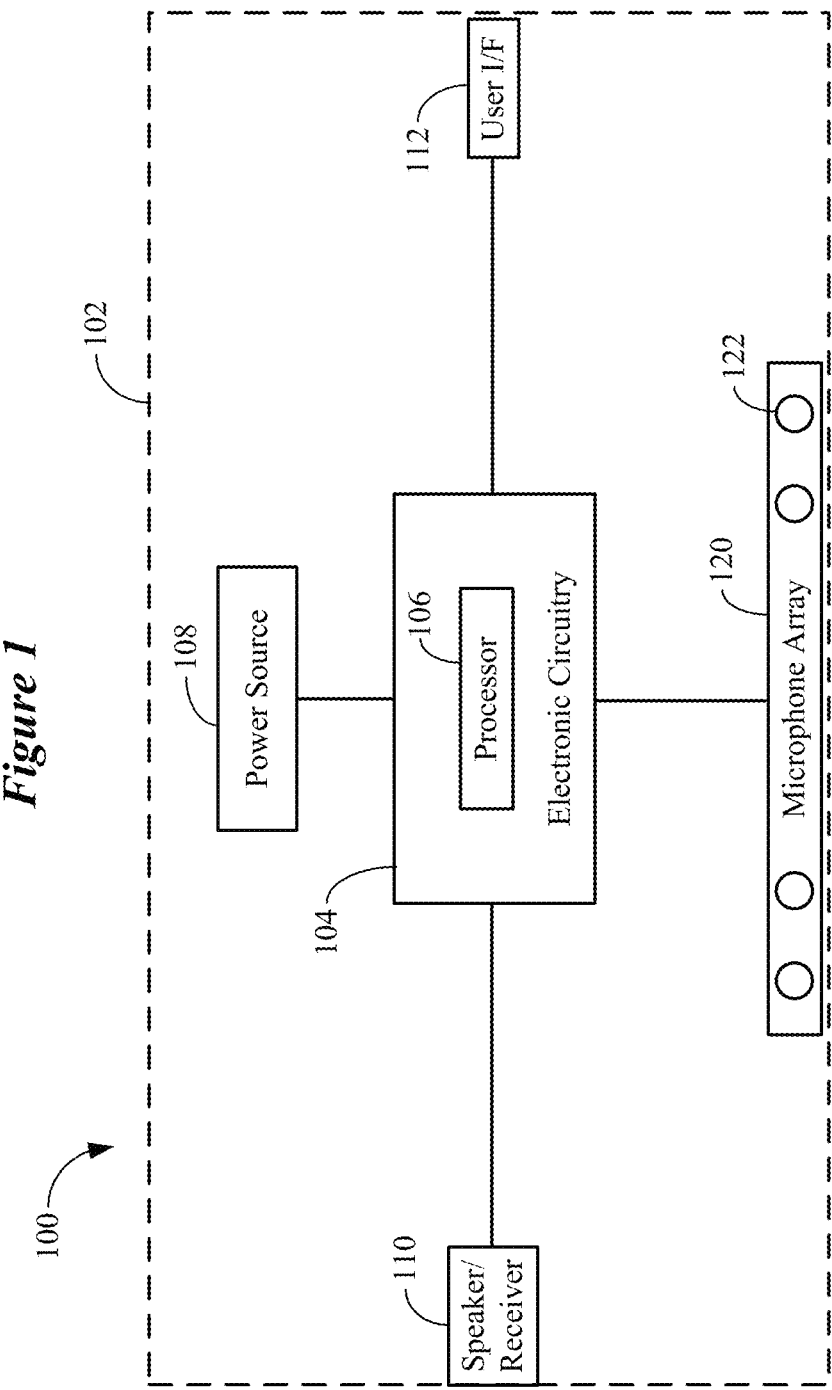
FIG. 1 illustrates an ear-worn electronic device configured to implement a microphone fault reduction methodology in accordance with any of the embodiments disclosed herein.

It is understood that the embodiments described herein may be used with any electronic device without departing from the scope of this disclosure. Representative electronic devices include, but are not limited to, ear-worn or ear-level electronic devices, body-worn electronic devices, consumer electronic devices, professional or commercial electronic devices, and special-purpose electronic devices. The devices depicted in the figures are intended to demonstrate the subject matter, but not in a limited, exhaustive, or exclusive sense.

Proper performance of hearing and other electronic devices depends in large part on the proper functioning of the microphones of such devices. In the case of hearing devices, such as hearing aids for example, foreign material in microphones is a leading cause of hearing aid returns. Foreign material causes degradation in sensitivity, at best causing matched microphones to become unmatched, and at worst, causing a microphone to fail. Directionality in a dual-omnidirectional microphone system of a hearing device, for example, relies on front and rear microphone sensitivities being well matched.

The following are representative scenarios that can occur in a dual-omnidirectional microphone system of a hearing device when either the front or rear microphone performance is degraded by foreign material. In a first scenario, it is assumed that the microphone system is operating in a directional mode, and the front microphone is plugged with foreign material. The presence of foreign material in this first scenario results in excessive low frequency amplification and degraded or non-functioning directionality. In a second scenario, it is assumed that the microphone system is operating in a directional mode, and the rear microphone is plugged with foreign material. The presence of foreign material in this second scenario results in excessive low-frequency amplification and degraded or non-functioning directionality. In a third scenario, it is assumed that the microphone system is operating in an omnidirectional mode using either the front or the rear microphone as the omnidirectional microphone, and the omnidirectional microphone is plugged with foreign material. The presence of foreign material in this third scenario results in increased noise, decreased volume, or a nonresponsive (e.g., dead) microphone system. In a fourth scenario, it is assumed that the microphone system is operating in an omnidirectional mode, and the rear microphone is plugged with foreign material. The presence of foreign material in this third scenario may or may not result in noticeable changes in microphone system performance.

Presently, when either microphone of a dual-omnidirectional microphone system is damaged or blocked by foreign material, directional performance is degraded and bass is excessively boosted, while the omnidirectional mode sounds weak or dead if the front microphone is blocked. This inhibits the use of the hearing device and is a leading cause of hearing device returns, as previously mentioned.

Embodiments of the disclosure are directed to a microphone fault detection system and method for use in hearing devices and other electronic devices that incorporate two or more microphones, such as a microphone array. According to any of the embodiments disclosed herein, a microphone fault detection system and method allows a hearing device or other electronic device to detect degradation in performance of any microphone of a microphone set or array, and to switch microphone operation to a safe mode using at least one non-degraded microphone in response to detecting microphone performance degradation. For example, a microphone fault detection system and method can be configured to monitor microphones of a microphone array operating in a directional mode, and to switch from the directional mode to a safe mode when the directional mode is impaired by a degraded microphone. The safe mode allows the hearing device or other electronic device to continue operating at an acceptable performance level notwithstanding the presence of one or more degraded microphones. The user of the hearing device or other electronic device is preferably notified audibly or via an accessory device that the device is operating at a reduced performance level due to impairment of the microphone system. As such, the hearing device or other electronic device can be used without interruption by the user, albeit in a reduced performance mode, until the device can be evaluated and/or repaired.

By way of example, a microphone fault detection system and method implemented by a hearing device or other electronic device can be configured to monitor the relative sensitivities of two sensitivity-matched (e.g., calibrated) microphones operating in a dual-omnidirectional microphone system. By automatically monitoring changes (e.g., drift) in microphone sensitivity relative to a threshold (e.g., a sensitivity measured at the time of microphone manufacture), the microphone fault detection system can identify which, if any, microphone is damaged or blocked by foreign material. For example, a processor of the microphone fault detection system can be configured to automatically compensate for microphone sensitivity drift of the two sensitivity-matched microphones when operating in the directional mode. The processor can be configured to detect degradation in performance of either microphone in response to an inability to automatically compensate for the microphone sensitivity drift.

According to a semi-manual approach, a wearer can place the hearing device on a table and run a diagnostic using an app executed by a smartphone or laptop. The diagnostic involves playing back test tones at a predetermined amplitude and measuring the sensitivity of the hearing device microphones in response to the test tones. The sensitivity measurements are compared against known sensitivity values established for the microphones (e.g., at the time of manufacture). The diagnostic can detect a change in microphone sensitivity beyond its known sensitivity value, which is indicative of a degraded or damaged microphone. This semi-manual approach can be used to detect a degraded or damaged microphone of other electronic devices, such as body-worn and consumer electronic devices.

In response to detecting a degraded microphone via an automatic or semi-automatic approach, the microphone fault detection system can cause the hearing or electronic device to enter a "safe" mode which, as discussed previously, allows the device to continue operating, albeit at a reduced performance level. Switching the device to a safe mode can involve disabling a directionality mode and using the non-degraded microphone as an omnidirectional microphone.

By way of further example, discovery of a degraded microphone and automatic microphone sensitivity matching can take into account differences in sensitivity across frequency. For example, a particular microphone may go out of calibration in one frequency region, while operating normally in one or more other frequency regions. In response to detecting degradation of microphone performance in a particular frequency region, the hearing device or other electronic device can switch to a safe mode for the particular frequency region, while operating normally in other frequency regions.

Embodiments of the disclosure are defined in the claims. However, below there is provided a non-exhaustive listing of non-limiting examples. Any one or more of the features of these examples may be combined with any one or more features of another example, embodiment, or aspect described herein.

Example Ex1. An ear-worn electronic device configured to be worn by a wearer, comprising a housing configured to be supported in, on or about an ear of the wearer; electronic circuitry disposed in the housing and comprising a processor; a power source and a receiver or a speaker respectively disposed in or on the housing; and a microphone array disposed in or on the housing and operatively coupled to the electronic circuitry, the microphone array comprising a plurality of microphones. The processor is configured to operate a set of two or more of the microphones in a directional mode; detect degradation in performance of any microphone of the microphone set; and switch microphone operation from the directional mode to a safe mode using at least one non-degraded microphone of the microphone set in response to detecting the microphone performance degradation.

Example Ex2. The device according to Ex1, wherein the safe mode is a mode that provides a sound quality higher than that provided by the directional mode that uses one or more degraded microphones of the microphone set.

Example Ex3. The device according to Ex1, wherein the safe mode is an omnidirectional mode that uses the at least one non-degraded microphone of the microphone set.

Example Ex4. The device according to Ex1, wherein the safe mode is a second directional mode that uses at least two non-degraded microphones of the microphone set.

Example Ex5. The device according to one or more of Ex1 to Ex4, wherein the two or more microphones of the microphone set are microphones calibrated at the time of manufacture to have substantially equal sensitivities, and the processor is configured to detect degradation in microphone performance as a mismatch in sensitivities of any of the two or more microphones of the microphone set, and compare a detected change in sensitivities of any of the two or more microphones of the microphone set to a predetermined sensitivity threshold.

Example Ex6. The device according to one or more of Ex1 to Ex5, wherein the processor is configured to automatically compensate for microphone sensitivity drift of the two or more microphones of the microphone set when operating in the directional mode, and detect degradation in performance of any microphone of the microphone set in response to an inability to automatically compensate for the microphone sensitivity drift.

Example Ex7. The device according to one or more of Ex1 to Ex6, wherein the processor is configured to one or both of generate an audible alert in response to detecting degradation in performance of any microphone of the microphone set, generate an alert signal in response to detecting degradation in performance of any microphone of the microphone set and communicate the alert signal to an external electronic device configured to communicatively couple to the ear-worn electronic device.

Example Ex8. An electronic system comprising the ear-worn electronic device according to one or more of Ex1 to Ex7 and an electronic accessory device comprising a second processor and configured to communicatively couple to the ear-worn electronic device, wherein one or both of the processor of the ear-worn device and the second processor are configured to operate a set of two or more of the microphones in a directional mode, detect degradation in performance of any microphone of the microphone set, and switch microphone operation from the directional mode to the safe mode using at least one non-degraded microphone of the microphone set in response to detecting the microphone performance degradation.

Example Ex9. The system according to Ex8, wherein the processor of the ear-worn device is configured to operate the set of two or more of the microphones in the directional mode, the second processor is configured to detect degradation in performance of any microphone of the microphone set, and the processor of the ear-worn device is configured to switch microphone operation from the directional mode to the safe mode in response to the second processor detecting the microphone performance degradation.

Example Ex10. A method implemented by an ear-worn electronic device worn by a wearer, comprising operating a set of two or more microphones of the ear-worn electronic device in a directional mode, detecting degradation in performance of any microphone of the microphone set, and switching microphone operation from the directional mode to a safe mode using at least one non-degraded microphone of the microphone set in response to detecting the microphone performance degradation.

Example Ex11. The method according to Ex10, wherein the safe mode is an omnidirectional mode and the method comprises operating first and second microphones of the microphone set in the directional mode, detecting degradation in performance of the first and second microphones, and switching from the directional mode to the omnidirectional mode using the non-degraded first or second microphone.

Example Ex12. The method according to Ex10 or Ex11, wherein the safe mode is a mode that provides a sound quality higher than that provided by the directional mode that uses one or more degraded microphones of the microphone set, an omnidirectional mode that uses the at least one non-degraded microphone of the microphone set, or a second directional mode that uses at least two non-degraded microphones of the microphone set.

Example Ex13. The method according to one or more of Ex10 to Ex12, wherein the two or more microphones of the microphone set are microphones calibrated at the time of manufacture to have substantially equal sensitivities, and the method comprises detecting degradation in microphone performance as a mismatch in sensitivities of any of the two or more microphones of the microphone set, comparing a detected change in sensitivities of any of the two or more microphones of the microphone set to a predetermined sensitivity threshold.

Example Ex14. The method according to one or more of Ex10 to Ex12, comprising automatically compensating for microphone sensitivity drift of the two or more microphones of the microphone set when operating in the directional mode, and detecting degradation in performance of any microphone of the microphone set in response to an inability to automatically compensate for the microphone sensitivity drift.

Example Ex15. The method according to one or more of Ex10 to Ex14, comprising generating an audible alert or an alert signal in response to detecting degradation in performance of the first and second microphones.

Example Ex16. An electronic device, comprising a housing, electronic circuitry disposed in the housing and comprising a processor and a power source, and a microphone array disposed in or on the housing and operatively coupled to the electronic circuitry. The microphone array comprises a plurality of microphones and the processor is configured to operate a set of two or more of the microphones in a directional mode, detect degradation in performance of any microphone of the microphone set, and switch microphone operation from the directional mode to a safe mode using at least one non-degraded microphone of the microphone set in response to detecting the microphone performance degradation.

Example Ex17. The device according to Ex16, comprising a speaker disposed in or on the housing and operatively coupled to the electronic circuitry.

Example Ex18. The device according to Ex16, wherein the device comprises a voice-controlled intelligent personal assistant.

Example Ex19. The device according to Ex16, wherein the device comprises a teleconference phone.

Example Ex20. An electronic system comprising an ear-worn electronic device configured to be worn by a wearer and comprises a housing configured to be supported in, on or about an ear of the wearer, electronic circuitry disposed in the housing and comprising a first processor, a power source and a receiver or a speaker respectively disposed in or on the housing, and a microphone array disposed in or on the housing and operatively coupled to the electronic circuitry, the microphone array comprising a plurality of microphones. An electronic accessory device of the system comprises a second processor configured to communicatively couple to the ear-worn electronic device, wherein the first processor, the second processor, or the first and second processors operating cooperatively are configured to operate a set of two or more of the microphones in a directional mode, detect degradation in performance of any microphone of the microphone set, and switch microphone operation from the directional mode to a safe mode using at least one non-degraded microphone of the microphone set in response to detecting the microphone performance degradation.

Example Ex21. The system according to Ex20, wherein the first processor is configured to operate the set of two or more of the microphones in the directional mode, the second processor is configured to detect degradation in performance of any microphone of the microphone set, and the first processor is configured to switch microphone operation from the directional mode to the safe mode in response to the second processor detecting the microphone performance degradation.

Example Ex22. The system according to Ex20, wherein the first processor is configured to operate the set of two or more of the microphones in the directional mode, the second processor is configured to detect degradation in performance of any microphone of the microphone set, and the second processor is configured to instruct the first processor to switch microphone operation from the directional mode to the safe mode in response to the second processor detecting the microphone performance degradation.

Example Ex23. The system according to Ex20, wherein the second processor is configured to operate the set of two or more of the microphones in the directional mode, the second processor is configured to detect degradation in performance of any microphone of the microphone set, and the second processor is configured to instruct the first processor to switch microphone operation from the directional mode to the safe mode in response to the second processor detecting the microphone performance degradation.

Example Ex24. A method implemented by an ear-worn electronic device worn by a wearer comprises operating a set of two or more microphones of the ear-worn electronic device in a directional mode, detecting, by a processor of the ear-worn electronic device, degradation in performance of any microphone of the microphone set, and switching microphone operation from the directional mode to a safe mode using at least one non-degraded microphone of the microphone set in response to detecting the microphone performance degradation.

Example Ex25. A method implemented by an ear-worn electronic device worn by a wearer comprises operating a first microphone and a second microphone of the ear-worn electronic device in a directional mode, detecting, by a processor of the ear-worn electronic device, degradation in performance of the first and second microphones, and switching from the directional mode to an omnidirectional mode using the non-degraded first or second microphone.

Example Ex26. A method implemented by an electronic device comprises operating a set of two or more microphones of the electronic device in a directional mode, detecting, by a processor of the electronic device, degradation in performance of any microphone of the microphone set, and switching microphone operation from the directional mode to a safe mode using at least one non-degraded microphone of the microphone set in response to detecting the microphone performance degradation.

Example Ex27. The method according to one or more of Ex24 to Ex26, comprising generating an audible alert or an alert signal in response to detecting degradation in performance of the first and second microphones Example Ex28. A method implemented by an ear-worn electronic device and an electronic accessory device comprises operating a set of two or more microphones of the ear-worn electronic device in a directional mode, detecting, by a processor of the ear-worn electronic device or the electronic accessory device, degradation in performance of any microphone of the microphone set, and switching microphone operation from the directional mode to a safe mode using at least one non-degraded microphone of the microphone set in response to detecting the microphone performance degradation.

FIG. 1 illustrates an ear-worn electronic device configured to implement a microphone fault reduction methodology in accordance with any of the embodiments disclosed herein. The ear-worn electronic device 100 (also referred to herein as a "hearing device") includes a housing 102 (e.g., a shell) within which internal components are disposed. Electronic circuitry 104 is disposed in the housing 102 and comprises a processor 106. Typically, the electronic circuitry 104 includes other components, such as memory and power management circuitry, for example. The electronic circuitry 104 is coupled to a power source 108, which provides power for the various electronic and electrical components of the hearing device 100. A speaker or receiver 110 is operatively coupled to the electronic circuitry 104. A user interface 112 is operatively coupled to the electronic circuitry 104. The user interface 112 may include one or more user actuated buttons or controls, voice recognition circuitry, gesture detection circuitry (e.g., for detecting finger and/or hand gestures), or any combination of these user interface apparatuses and techniques.

A microphone array 120 is disposed in or on the housing 102, and is coupled to the electronic circuitry 104. The microphone array 120 includes two or more microphones 122. Although shown positioned along one side of the housing 102 in FIG. 1, it is understood that the microphone array 120 can include microphones 122 disposed at different locations of the housing 102. For example, the microphone array 120 can include a multiplicity of microphones 122 positioned at disparate locations of the housing 102. The processor 106 and the microphone array 120 are configured to implement a microphone fault reduction methodology in accordance with any of the embodiments disclosed herein.

The processor 106 can be implemented as one or more of a multi-core processor, a digital signal processor (DSP), a microprocessor, a programmable controller, a general-purpose computer, a special-purpose computer, a hardware controller, a software controller, a combined hardware and software device, such as a programmable logic controller, and a programmable logic device (e.g., FPGA, ASIC). The processor 106 can include or be coupled to memory, such as RAM, SRAM, ROM, or flash memory. The power source 108 can include a rechargeable battery (e.g., lithium-ion battery), a conventional battery, and/or a supercapacitor arrangement.

The microphone array 120 includes at least two microphones 122. For example, the microphone array 120 can include at least a front microphone 122 and a rear microphone 122 of a behind-the-ear device. The microphone array 120 can include more than two microphones 122, such as any number of microphones between 3 and 6, for example. In other embodiments, such as consumer electronic devices discussed below, microphone array 120 can include any number of microphones between 2 and 12 or more (e.g., between 2 and 50).

The microphones 122 of the microphone array 120 can be any microphone type. In some embodiments, the microphones 122 are omnidirectional microphones. In other embodiments, the microphones 122 are directional microphones. In further embodiments, the microphones 122 are a combination of one or more omnidirectional microphones and one or more directional microphones. One, some, or all of the microphones 122 can be microphones having a cardioid, hypercardioid, supercardioid or lobar pattern, for example.

One, some, or all of the microphones 122 can be multi-directional microphones, such as bidirectional microphones. One, some, or all of the microphones 122 can have variable directionality, allowing for real-time selection between omnidirectional and directional patterns (e.g., selecting between omni, cardioid, and shotgun patterns).

Depending on the device implementation (e.g., hearing device, body-worn device, off-body consumer electronic device), different microphone technologies can be used. For example, an electronic device can incorporate any of the following microphone technology types (or combination of types): MEMS (micro-electromechanical system) microphones (e.g., capacitive, piezoelectric MEMS microphones), moving coil/dynamic microphones, condenser microphones, electret microphones, ribbon microphones, crystal/ceramic microphones (e.g., piezoelectric microphones), boundary microphones, PZM (pressure zone microphone) microphones, and carbon microphones.

In accordance with any of the embodiments disclosed herein, the microphone array 120 can be implemented to provide a directional response, also known as beamforming, that filters out unwanted noise and processes sound from a more desired direction or directions. The ratio of the desired sound (signal) to the undesired sounds (noise) is termed the signal-to-noise ratio (SNR). The microphone array 120 can be configured to enhance the desired sound and to reduce the undesired sounds and thus improve the SNR of the hearing device (or other body-worn or off-body electronic device). Various microphone array configurations are contemplated including, but not limited to, endfire microphone arrays and broadside microphone arrays, for example.

Two or more microphones 122 of the microphone array 120 are used to collect audio sounds and the electrical signals from each microphone are combined to produce a resultant electrical signal. The processor 106, or separate electronic circuitry coupled to the processor 106, can be configured to process the electrical signals from each microphone (e.g., amplify, delay, filter, etc.) before the electrical signals are combined. For example, microphone array-based processing techniques implemented by the processor 106 can facilitate an improvement in signal-to-noise ratio, a reduction of the effects of reverberation, and a reduction of feedback.

As a result of the electrical signal processing performed by the processor 106, the desired signals are enhanced and the undesired signals are attenuated. To facilitate efficient signal processing by the processor 106, the microphones 122 employed in the microphone array 120 preferably have tightly matched performance specifications and/or are individually characterized for specification performance. The sensitivity of the microphones 122 is generally considered the primary parameter that needs to be well matched in the microphone array 120. In some embodiments, the processor 106 can be configured to cooperate with the microphone array 120 to provide automatic noise suppression (ANS) and/or automatic gain control (ACG). The processor 106 can be configured to cooperate with the microphone array 120 to provide echo cancellation and/or dynamic microphone steering.

The term hearing device of the present disclosure refers to a wide variety of ear-level electronic devices that can aid a person with impaired hearing. The term hearing device also refers to a wide variety of devices that can produce processed sound for persons with normal hearing. Hearing devices of the present disclosure include hearables (e.g., wearable earphones, headphones, earbuds, virtual reality headsets), hearing aids (e.g., hearing instruments), cochlear implants, and bone-conduction devices, for example. Hearing devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Throughout this disclosure, reference is made to a "hearing device," which is understood to refer to a system comprising a single left ear device, a single right ear device, or a combination of a left ear device and a right ear device.

Figure 2:
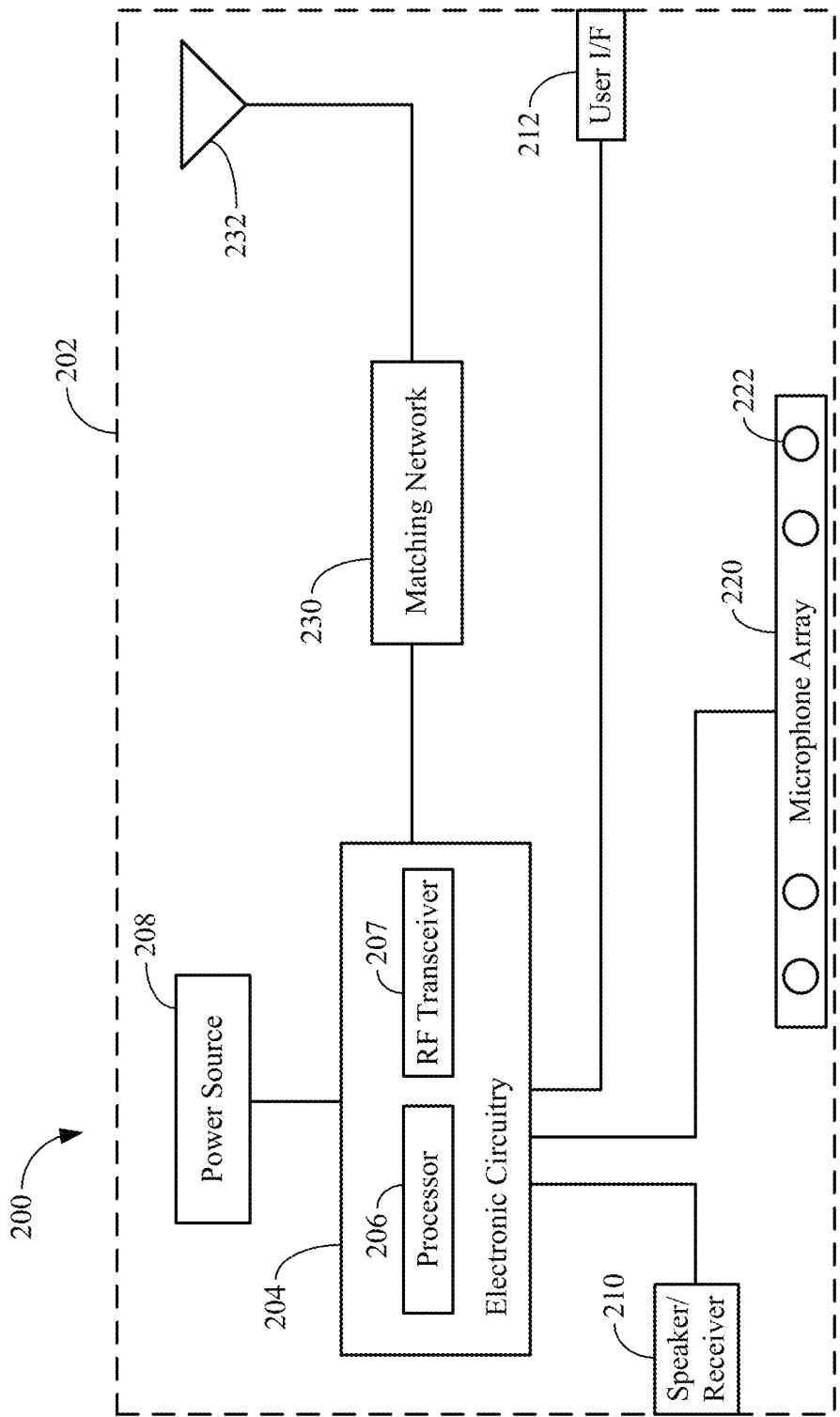
FIG. 2 illustrates an ear-worn electronic device configured to implement a microphone fault reduction methodology in accordance with any of the embodiments disclosed herein.

FIG. 2 illustrates an ear-worn electronic device configured to implement a microphone fault reduction methodology in accordance with any of the embodiments disclosed herein. The hearing device 200 shown in FIG. 2 includes a housing 202 (e.g., a shell) within which internal components are disposed. Electronic circuitry 204 is disposed in the housing 202 and comprises a processor 206 of a type described herein. Typically, the electronic circuitry 204 includes other components, such as memory and power management circuitry, for example. The electronic circuitry 204 is coupled to a power source 208, which provides power for the various electronic and electrical components of the hearing device 200. The power source 208 can be of a type described herein. A speaker or receiver 210 is operatively coupled to the electronic circuitry 204. A user interface 212 is operatively coupled to the electronic circuitry 204 and may be of a type described herein. A microphone array 220 is disposed in or on the housing 202, and is coupled to the electronic circuitry 204. The microphone array 220 can be of a type and functionality described herein. The processor 206 and the microphone array 220 are configured to implement a microphone fault reduction methodology in accordance with any of the embodiments disclosed herein.

The hearing device 202 shown in FIG. 2 incorporates a communication device in the form of a radiofrequency (RF) transceiver 207, such as a Bluetooth® transceiver or other type of RF transceiver. The hearing device 202 incorporates an antenna 232 coupled to the RF transceiver 207, which can be implemented as a 2.4 GHz radio. The RF transceiver 207 can conform to an IEEE 802.11 (e.g., WiFi®) or Bluetooth® (e.g., BLE, Bluetooth® 4. 2 or 5.0) specification, for example. It is understood that hearing devices of the present disclosure can employ other transceivers or radios, such as a 900 MHz radio. The RF transceiver 207 and antenna 232 are configured to wirelessly communicate with an external electronic device or system. In addition, the RF transceiver 207 and antenna 232 can be configured to facilitate communication between a left hearing device and a right hearing device, so as to implement ear-to-ear communication between the left and right hearing devices. The hearing device 202 can also include a near-field magnetic induction (NFMI) device to effect communication between left and right hearing devices.

The antenna 232 can be any type of antenna suitable for use with a particular hearing device 202. A representative list of antennas 232 include, but are not limited to, patch antennas, planar inverted-F antennas (PIFAs), inverted-F antennas (IFAs), chip antennas, dipoles, monopoles, dipoles with capacitive-hats, monopoles with capacitive-hats, folded dipoles or monopoles, meandered dipoles or monopoles, loop antennas, Yagi-Udi antennas, log-periodic antennas, and spiral antennas. Many of these types of antenna can be implemented in the form of a flexible circuit antenna. In such embodiments, the antenna 232 is directly integrated into a circuit flex, such that the antenna 232 does not need to be soldered to a circuit that includes the RF transceiver 207 and remaining RF components.

Hearing devices of the present disclosure can be configured to receive streaming audio (e.g., digital audio data or files) from an electronic or digital source. Representative electronic/digital sources (e.g., accessory devices) include an assistive listening system, a TV streamer, a radio, a music player, a smartphone, a laptop, a cell phone/entertainment device (CPED) or other electronic device that serves as a source of digital audio data or other types of data files. Hearing devices of the present disclosure can be configured to effect bi-directional communication (e.g., wireless communication) of data with an external source, such as a remote server via the Internet or other communication infrastructure.

Figure 3:
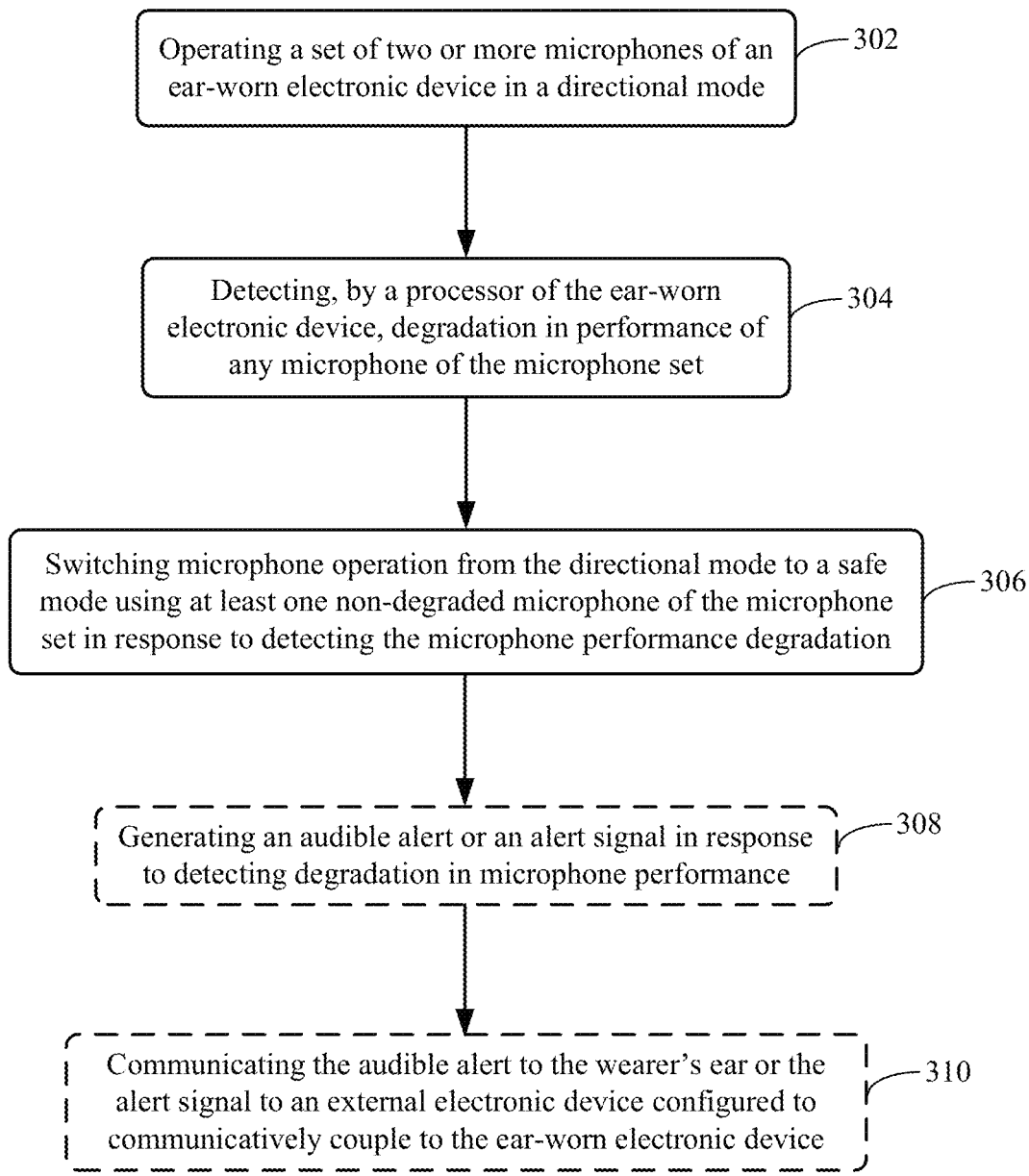
FIG. 3 illustrates a microphone fault reduction method implemented by an ear-worn electronic device in accordance with any of the embodiments disclosed herein.

FIG. 3 illustrates a microphone fault reduction method implemented by an ear-worn electronic device in accordance with any of the embodiments disclosed herein. The method shown in FIG. 3 can be implemented by a hearing device (or other electronic device disclosed herein) which includes a microphone array comprising two or more microphones (e.g., any number of microphones between 2 and 6). The method shown in FIG. 3 involves operating 302 a set of two or more microphones of the ear-worn electronic device in a directional mode. The method involves detecting 304, by a processor of the ear-worn electronic device, degradation in performance of any microphone of the microphone set. The method further involves switching 306 microphone operation from the directional mode to a safe mode using at least one non-degraded microphone of the microphone set in response to detecting the microphone performance degradation. The method can also involve generating 308 an audible alert or an alert signal in response to detecting degradation in microphone performance. The method can further involve communicating 310 the audible alert to the wearer's ear or the alert signal to an external electronic device, such as a device configured to communicatively couple to the ear-worn electronic device (e.g., a smartphone).

Figure 4:
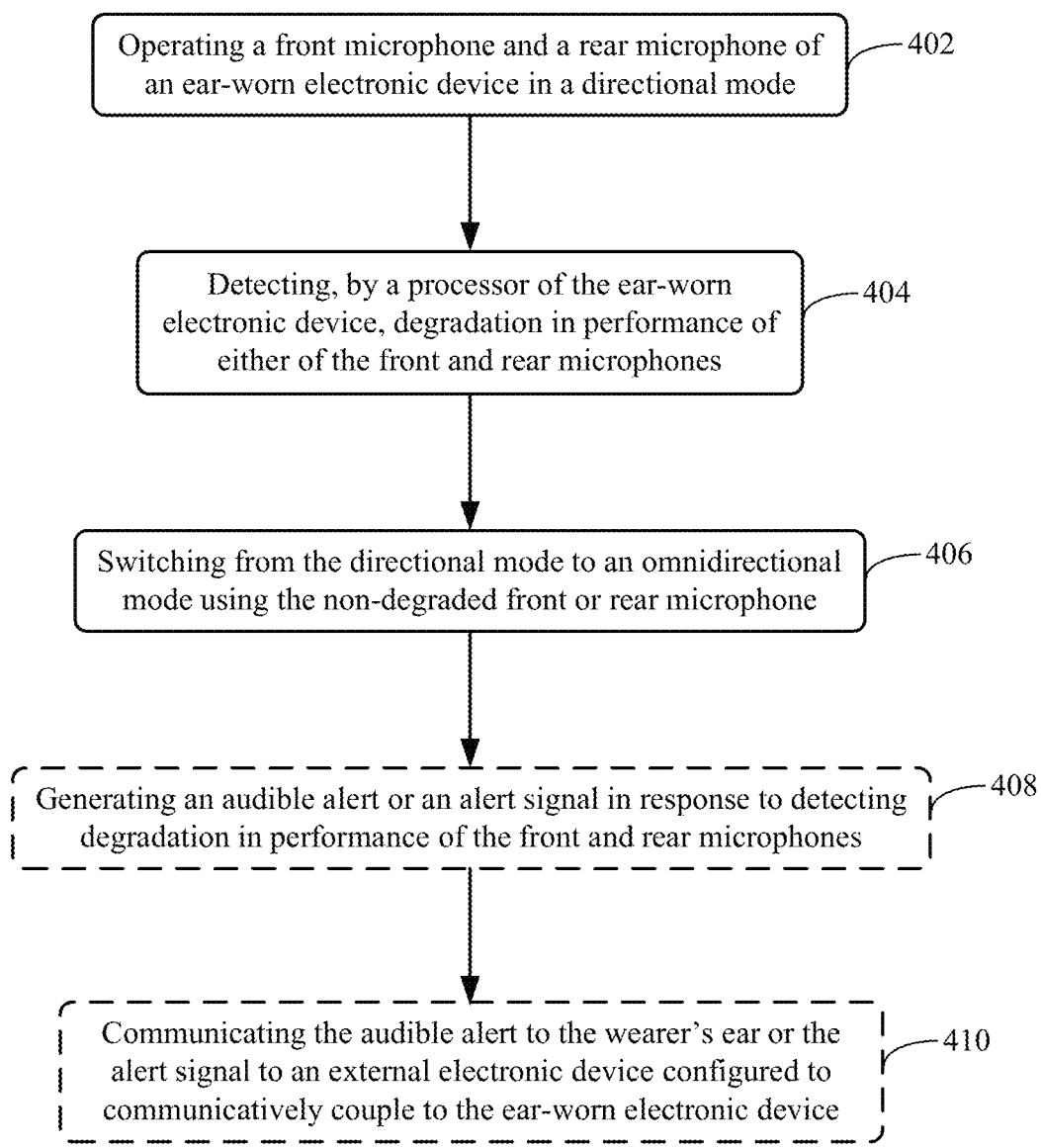
FIG. 4 illustrates a microphone fault reduction method implemented by an ear-worn electronic device in accordance with any of the embodiments disclosed herein.

FIG. 4 illustrates a microphone fault reduction method implemented by an ear-worn electronic device in accordance with any of the embodiments disclosed herein. The method shown in FIG. 4 can be implemented by a hearing device (or other electronic device disclosed herein) which includes a dual-omnidirectional microphone system comprising a front microphone (forward facing when positioned on or in a wearer's ear) and a rear microphone (rearward facing when positioned on or in the wearer's ear). The method shown in FIG. 4 involves operating 402 the front and rear microphones of the ear-worn electronic device in a directional mode. The method involves detecting 404, by a processor of the ear-worn electronic device, degradation in performance of either of the front and rear microphones. The method further involves switching 406 microphone operation from the directional mode to an omnidirectional mode using the non-degraded front or rear microphone. The method can also involve generating 408 an audible alert or an alert signal in response to detecting degradation in microphone performance. The method can further involve communicating 410 the audible alert to the wearer's ear or the alert signal to an external electronic device, such as a device configured to communicatively couple to the ear-worn electronic device.

Figure 5:
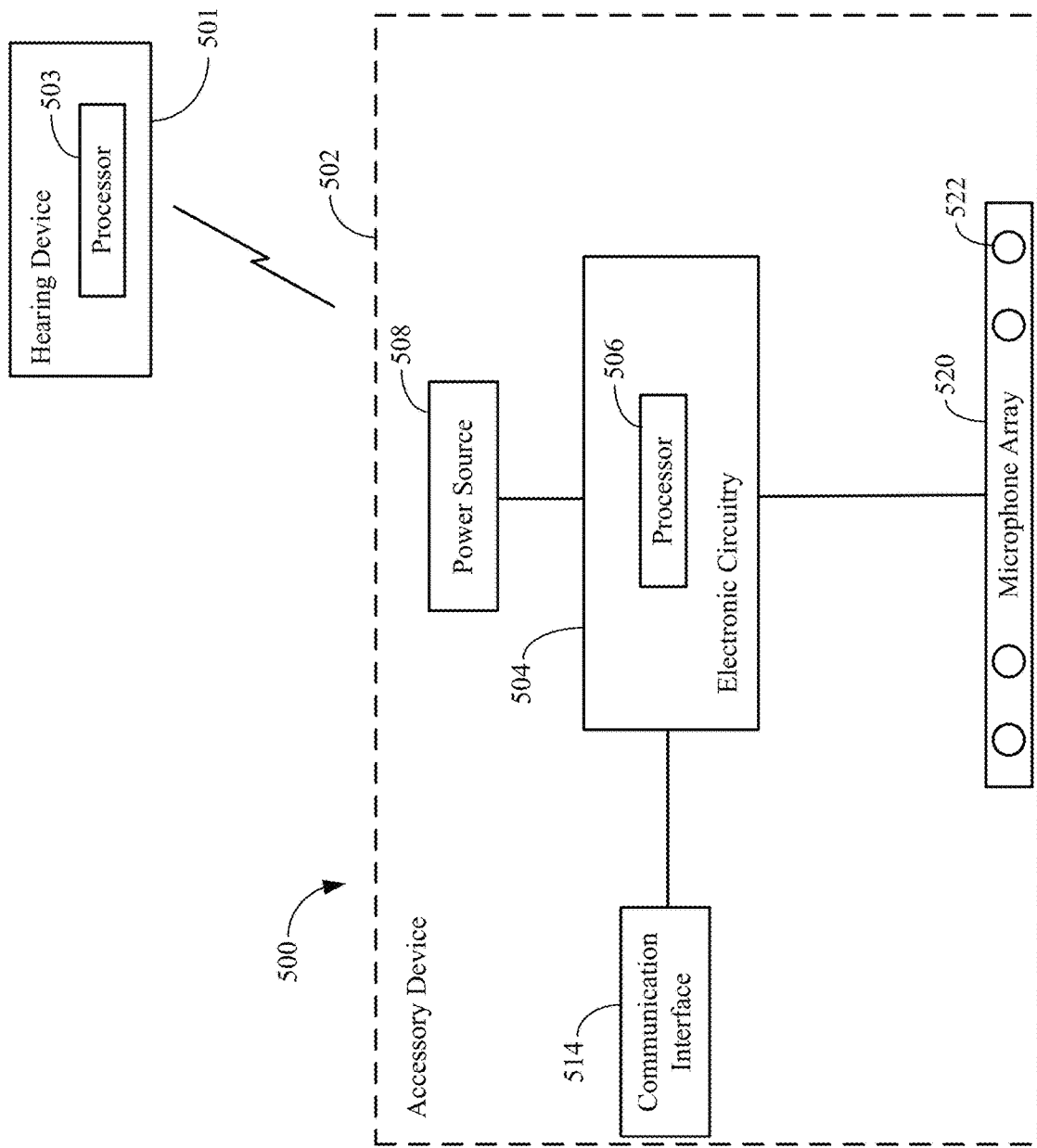
FIG. 5 illustrates an electronic device configured to implement a microphone fault reduction methodology in accordance with any of the embodiments disclosed herein.

FIG. 5 illustrates an electronic device configured to implement a microphone fault reduction methodology in accordance with any of the embodiments disclosed herein. The electronic device 500 shown in FIG. 5 is representative of any device configured to communicatively couple to one or more hearing devices 501, referred to herein as an accessory device (e.g., any of the electronic devices disclosed herein, such as those described below with reference to FIG. 6). For purposes of explanation, only one hearing device 501 is shown in FIG. 5.

The accessory device 500 includes a housing 502 configured to house or support various components of the device 500. Electronic circuitry 504 is disposed in the housing 502 and comprises a processor 506. The electronic circuitry 504 can include other components, such as memory and power management circuitry, for example. The electronic circuitry 504 is coupled to a power source 508, which provides power for the various electronic and electrical components of the accessory device 500. In some embodiments, a speaker and/or a user interface can be operatively coupled to the electronic circuitry 504. The accessory device 500 includes a microphone array 520 disposed in or on the housing 502, and is coupled to the electronic circuitry 504. The components of the accessory device 500 can be arranged and have functionality the same as or similar to the components described with reference to other figures.

The accessory device 500 also includes a communication interface 514, which is operatively coupled to the electronic circuitry 504. The communication interface 514 is configured to provide unidirectional or bidirectional wireless communication with the hearing device 501. For example, the communication interface 514 can be configured to provide inductive (e.g., via a telecoil), magnetic (via a magnetic antenna), and/or electromagnetic (e.g., via a Bluetooth® transceiver) coupling with the hearing device 501. It is understood that the hearing device 501 includes a communication interface that can include one or more of a telecoil, a magnetic antenna, and/or an electromagnetic receiver or transceiver. The communication interface 514 or a separate communication interface can be configured to provide unidirectional or bidirectional wireless or wired communication with an external electronic device or information source (e.g., a streaming source, a smartphone). The communication interface 514 or a separate communication interface can be configured as a Bluetooth®, ZigBee®, IEEE 802.11, ISO/IEEE 11073, USB, FireWire®, or Lightning® compliant communication interface or any combination of these communication interfaces.

In some embodiments, the accessory device 500 can be implemented as an inductive necklace or neck loop. According to this embodiment, the communication interface 514 includes a conducting neck loop configured to be worn around the wearer's neck. The microphone array 520 is worn on the chest as part of the accessory device 500. A processed signal from the microphone array 520 drives current through the conducting neck loop 514 thus creating a time-variable magnetic field that is representative of sound received by the microphone array 520. The magnetic field provides a wireless means for carrying the sound signal from the accessory device 500 to the hearing device 501. In order to receive the signal by the hearing device 501, the hearing device 501 includes a small induction coil (e.g., a telecoil). The hearing device 501 can be switched to a telecoil mode, such that the wearer hears the sound received by the microphone array 520 rather than the microphone arrangement of the hearing device 501. The microphone array 520 can include any number of microphones, such as any number of microphones between two and twenty.

In other embodiments, the accessory device 500 can be implemented as an electronic necklace or neck loop 500 configured to provide RF communication between the accessory device 500 and the hearing device 501. In such embodiments, the communication interface 514 and a transceiver or receiver of the hearing device 501 are configured for RF communication. For example, the communication interface 514 can be configured as a Bluetooth® transceiver or transmitter, and the hearing device 501 can include a Bluetooth® receiver or transceiver. The electronic device 500 can be configured to implement any of the microphone fault reduction methods disclosed herein, such as that shown in FIG. 7.

In various embodiments, and as previously described, a processor 503 of the hearing device 501 is configured to implement a microphone fault reduction method such as that illustrated in FIGS. 3 and 4. In other embodiments, the processor 506 of the electronic device 500 can perform at least some operations of a microphone fault reduction method in corporation with the processor 503 of the hearing device 501. For example, the processor 506 of the electronic device 500 can be configured to detect degradation in performance of any microphone of the hearing device 501. In response to detecting hearing device microphone degradation, the processor 506 of the electronic device 500 can inform the processor 503 of the hearing device 501 that a particular microphone(s) of the hearing device 501 has degraded in terms of performance. In response to being so informed, the processor 503 of the hearing device 501 can implement a corrective action. In some embodiments, the processor 506 of the electronic device 500 can control the processor 503 of the hearing device 501 to take a specific corrective action to address the microphone degradation problem.

For example, the processor 506 of the electronic device 500 can recommend that the processor 503 of the hearing device 501 switch microphone operation from a directional mode to a safe mode using at least one non-degraded microphone of the hearing device 501. By way of further example, the processor 506 of the electronic device 500 can cause the processor 503 of the hearing device 501 (e.g., via a command signal) to take a specified corrective action, such as switching microphone operation from a directional mode to a safe mode using at least one non-degraded microphone of the hearing device 501.

Figure 6:
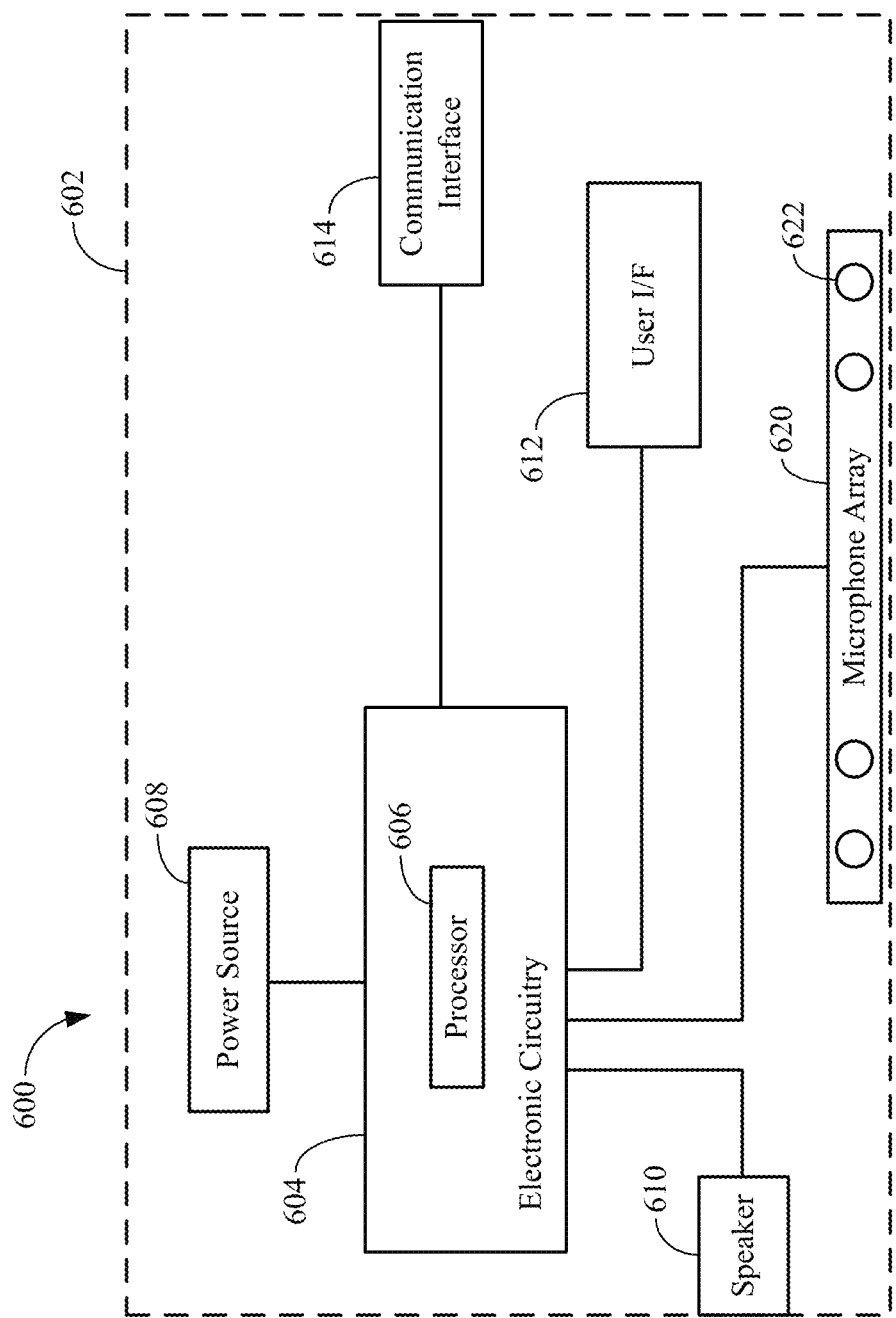
FIG. 6 illustrates an electronic device configured to implement a microphone fault reduction methodology in accordance with any of the embodiments disclosed herein.

FIG. 6 illustrates an electronic device configured to implement a microphone fault reduction methodology in accordance with any of the embodiments disclosed herein. The electronic device 600 shown in FIG. 6 is representative of any of a wide variety of electronic devices including, but not limited to, a body-worn electronic device, a consumer electronic device, a professional or commercial electronic device, and a special-purpose electronic device (referred to herein collectively as "electronic devices").

The electronic device 600 includes a housing 602 configured to house or support various components of the device 600. Electronic circuitry 604 is disposed in the housing 602 and comprises a processor 606. The electronic circuitry 604 can include other components, such as memory and power management circuitry, for example. The electronic circuitry 604 is coupled to a power source 608, which provides power for the various electronic and electrical components of the electronic device 600. The power source 608 can include a rechargeable battery (e.g., lithium-ion battery), a conventional battery, and/or power circuitry (e.g., an AC/DC converter) configured to receive power from a wall outlet. In some embodiments, a speaker 610 and/or a user interface 612 can be operatively coupled to the electronic circuitry 604. The user interface 612 can include manually actuated switches, a touch screen, a display (e.g., LED, OLED, e-ink), or a combination of these components. The electronic device 600 includes a microphone array 620 disposed in or on the housing 602, and is coupled to the electronic circuitry 604. The components of the electronic device 600 can be arranged and have functionality the same as or similar to the components described with reference to other figures.

The electronic device 600 also includes a communication interface 614, which is operatively coupled to the electronic circuitry 604. The communication interface 614 is configured to provide unidirectional or bidirectional wireless or wired communication with one or more external devices and/or systems. For example, the communication interface 614 can be configured as a Bluetooth®, ZigBee®, IEEE 802.11, ISO/IEEE 11073, USB, FireWire®, or Lightning® compliant communication interface or any combination of these communication interfaces. The communication interface 614 can be configured to provide wireless communication via a GSM (Global System for Mobile Communications), CDMA (Code Division Multiple Access), GPRS (General Packet Radio Service) and/or HSDPA (High-Speed Downlink Packet Access) protocol.

The electronic device 600 can be representative of any type of body-worn or hand-held electronic device including, but not limited to, fitness and/or health monitoring watches or other wrist worn or hand-held objects, e.g., Apple Watch®, Fitbit®, cell phones, smartphones, personal digital assistants, handheld and body-worn radios, body-worn remote microphones, body-worn remote speaker microphones, hearing aid accessories, wireless capable helmets (e.g., used in professional football), and wireless headsets/headphones (e.g., virtual reality headsets). The electronic device 600 can be representative of any type of consumer electronic device, such a security cameras, video cameras and camcorders, fixed or portable microphones, fixed or portable remote speaker microphones, digital recording devices, smartphones, tablets, phablets, laptops, teleconference phones, smart speakers, and voice-controlled intelligent personal assistants.

Figure 7:
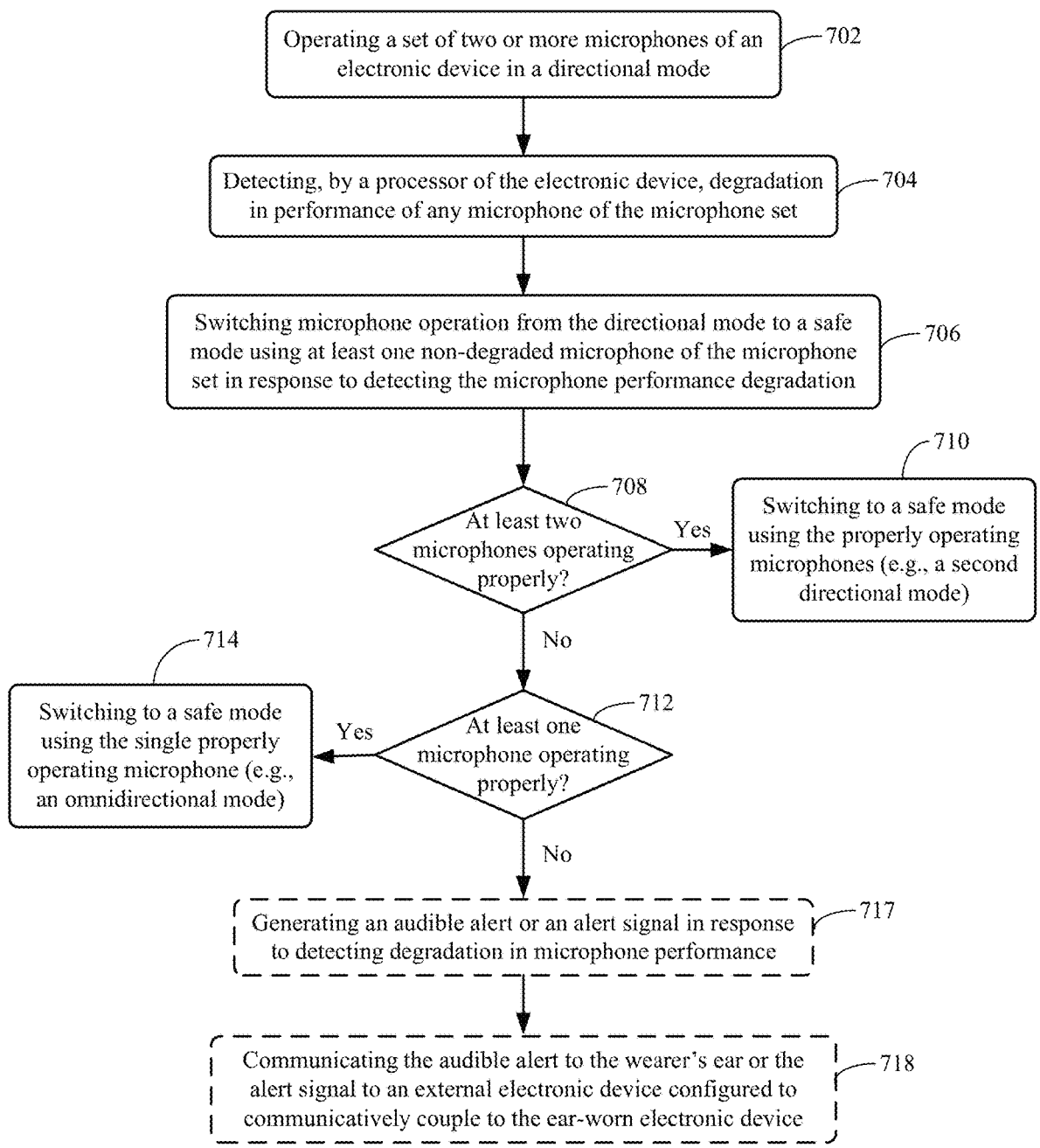
FIG. 7 illustrates a microphone fault reduction method implemented by an electronic device in accordance with any of the embodiments disclosed herein.

FIG. 7 illustrates a microphone fault reduction method implemented by an electronic device in accordance with any of the embodiments disclosed herein. The method shown in FIG. 7 can be implemented by any type of electronic device which includes a microphone array comprising more than two microphones (e.g., any number of microphones between 2 and 50). The method shown in FIG. 7 involves operating 702 a set of two or more microphones of the electronic device in a directional mode (e.g., a first directional mode). The method involves detecting 704, by a processor of the electronic device, degradation in performance of any microphone of the microphone set. The method further involves switching 706 microphone operation from the directional mode to a safe mode using at least one non-degraded microphone of the microphone set in response to detecting the microphone performance degradation.

A check 708 is made to determine if at least two microphones of the microphone array are operating properly. If so, the method involves switching 710 to a safe mode using the properly operating microphones. For example, the safe mode can be a second directional mode that uses fewer properly operating microphones than the first directional mode. As another example, the safe mode can be a "double omni" mode that uses at least two properly operating microphones in an omnidirectional mode. If at least two microphones are not properly operating, a check 712 is made to determine if at least one microphone of the microphone array is operating properly. If so, the method involves switching 714 to a safe mode (e.g., an omnidirectional mode) using the single properly operating microphone.

The method shown in FIG. 7 can also involve generating 717 an audible alert or an alert signal in response to detecting degradation in microphone performance. The method can further involve communicating 718 the audible alert to the wearer's ear or the alert signal to an external electronic device, such as a device configured to communicatively couple to the ear-worn electronic device.

Figure 8A:
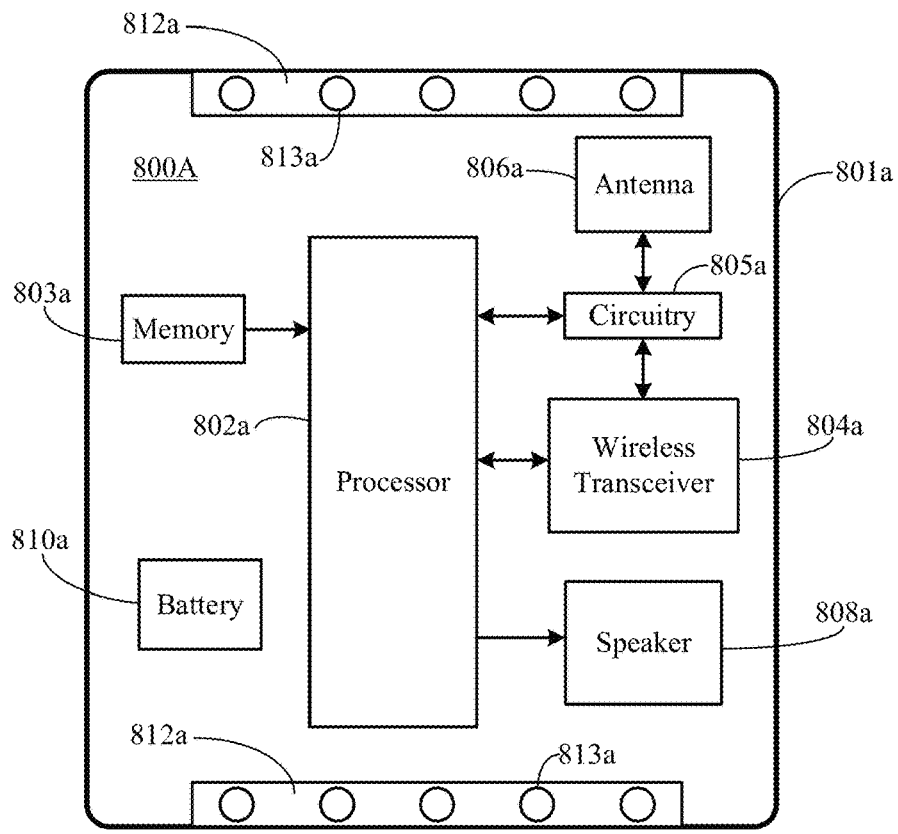
FIGS. 8A and 8B illustrate various components of a representative hearing device arrangement in accordance with various embodiments.
Figure 8B:
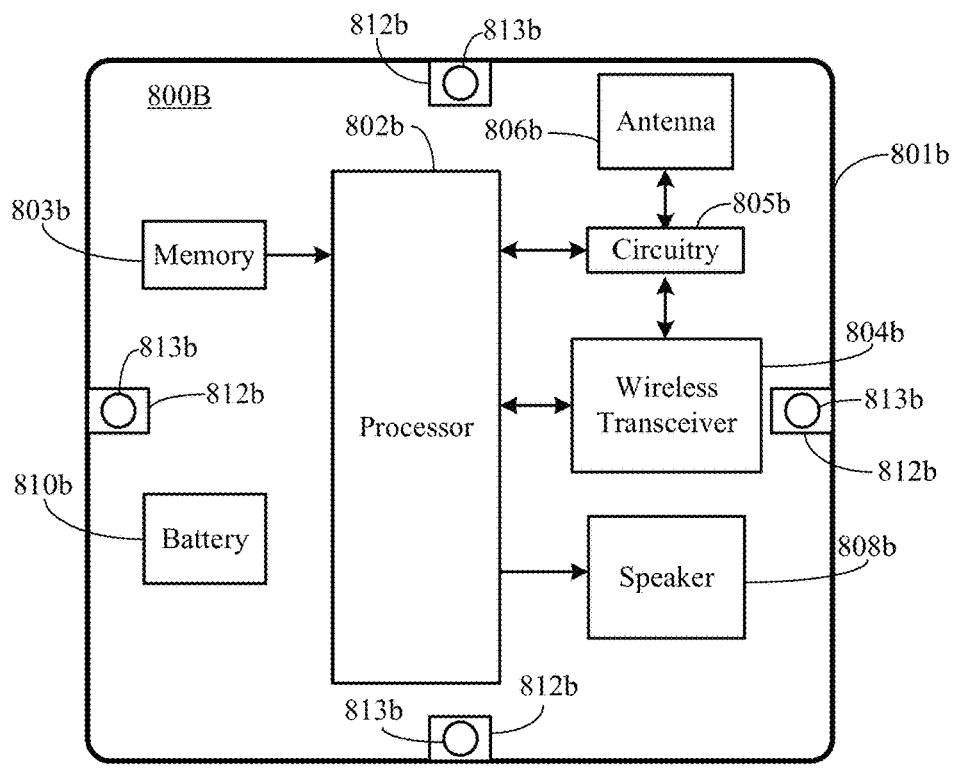

FIGS. 8A and 8B illustrate various components of a representative hearing device arrangement in accordance with various embodiments. FIGS. 8A and 8B illustrate first and second hearing devices 800A and 800B configured to be supported at, by, in or on left and right ears of a wearer. In some embodiments, a single hearing device 800A or 800B can be supported at, by, in or on the left or right ear of a wearer. As illustrated, the first and second hearing devices 800A and 800B include the same functional components. It is understood that the first and second hearing devices 800A and 800B can include different functional components. The first and second hearing devices 800A and 800B can be representative of any of the hearing devices disclosed herein.

The first and second hearing devices 800A and 800B include an enclosure 801a, 801b configured for placement, for example, over or on the ear, entirely or partially within the external ear canal (e.g., between the pinna and ear drum) or behind the ear. Disposed within the enclosure 801a, 801b is a processor 802a, 802b which incorporates or is coupled to memory 803a, 803b. The processor 802a, 802b can include or be implemented as a multi-core processor, a digital signal processor (DSP), an audio processor or a combination of these processors. For example, the processor 802a, 802b may be implemented in a variety of different ways, such as with a mixture of discrete analog and digital components that include a processor configured to execute programmed instructions contained in a processor-readable storage medium (e.g., solid-state memory, e.g., Flash).

The processor 802a, 802b is coupled to a wireless transceiver 804a, 804b (also referred to herein as a radio), such as a BLE transceiver or other IEEE 802.11 compliant transceiver. The wireless transceiver 804a, 804b is operably coupled to an antenna 806a, 806b configured for transmitting and receiving radio signals. Impedance matching circuitry 805a, 805b can be operably coupled to the wireless transceiver 804a, 804b and the antenna 806a, 806b. The antenna 806a, 806b is disposed in, on, or extends from the enclosure 801a, 801b. The wireless transceiver 804a, 804b and the antenna 806a, 806b can be configured to operate in the 2.4 GHz ISM frequency band or other applicable communication band. The wireless transceiver 804a, 804b and antenna 806a, 806b can be configured to enable ear-to-ear communication between the two hearing devices 800A and 800B, as well as communications with an external device (e.g., a smartphone or a digital music player). In some embodiments, the wireless transceiver 804a, 804b, matching circuitry 805a, 805b, and antenna 806a, 806b are excluded from the first and second hearing devices 800A and 800B.

A battery 810a, 810b or other power source (rechargeable or conventional) is provided within the enclosure 801a, 801b and is configured to provide power to the various components of the hearing devices 800A and 800B. The battery 810a, 810b can be coupled to power management circuitry (not shown), such as a power management integrated circuit (PMIC), to facilitate charging and power management functions. A speaker or receiver 808a, 808b is coupled to an amplifier (not shown) and the processor 802a, 802b. The speaker or receiver 808a, 808b is configured to generate sound which is communicated to the wearer's ear.

The hearing devices 800A and 800B include a microphone array 812a, 812b which includes two or more microphones 813a, 813b. The microphones 813a, 813b of the microphone array 812a, 812b can be distributed on the same or different surfaces or sides of the hearing devices 800A and 800B. For purposes of illustration, the microphone array 812a shown in FIG. 8A includes an array of microphones 813a disposed on two surfaces or sides of the hearing device 800A. For example, one or more microphones 813a can be disposed on respective front and rear surfaces of the hearing device 800A configured as a BTE device. The microphone array 812b shown in FIG. 8B includes single microphones 813b disposed on different surfaces or sides of the hearing device 800B or at different locations on the same surface or side of the hearing device 800B.

The microphones 813a, 813b can be coupled to a preamplifier (not shown), the output of which is coupled to the processor 802a, 802b. The microphones 813a, 813b receive sound waves from the environment and convert the sound into an electrical signal. The electrical signal is amplified by a preamplifier and sampled and digitized by an analog-to-digital converter of the processor 802a, 802b, resulting in a digitized input signal. The processor 802a, 802b can be configured to process electrical signals from each microphone 813a, 813b (e.g., amplify, delay, filter, etc.) before the electrical signals are combined to provide a directional response (e.g., beamforming) that filters out unwanted noise and processes sound from a more desired direction or directions.

In some embodiments (e.g., hearing aids), the processor 802a, 802b (e.g., DSP circuitry) is configured to process the digitized input signal into an output signal in a manner that compensates for the wearer's hearing loss. When receiving an audio signal from an external source, the wireless transceiver 804a, 804b may produce a second input signal for the DSP circuitry of the processor 802a, 802b that may be combined with the input signal produced by the microphones 813a, 813b or used in place thereof. In other embodiments, (e.g., hearables), the processor 802a, 802b can be configured to process the digitized input signal into an output signal in a manner that is tailored or optimized for the wearer (e.g., based on wearer preferences). The output signal is then passed to an audio output stage that drives the speaker or receiver 808a, 808b, which converts the output signal into an audio output.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electromagnetic signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. An ear-worn electronic device configured to be worn by a wearer, comprising:
    a housing configured to be supported in, on or about an ear of the wearer;
    electronic circuitry disposed in the housing and comprising a processor;
    a power source and a receiver or a speaker respectively disposed in or on the housing; and
    a microphone array disposed in or on the housing and operatively coupled to the electronic circuitry, the microphone array comprises a plurality of microphones;
    wherein the processor is configured to:
        operate a set of two or more of the microphones in a directional mode;

detect degradation in performance of any microphone of the microphone set; and switch microphone operation from the directional mode to a safe mode using at least one non-degraded microphone of the microphone set in response to detecting the microphone performance degradation.

2. The device of claim 1, wherein the safe mode is a mode that provides a sound quality higher than that provided by the directional mode that uses one or more degraded microphones of the microphone set.

3. The device of claim 1, wherein the safe mode is an omnidirectional mode that uses the at least one non-degraded microphone of the microphone set.

4. The device of claim 1, wherein the safe mode is a second directional mode that uses at least two non-degraded microphones of the microphone set.

5. The device of claim 1, wherein:
the two or more microphones of the microphone set are microphones calibrated at the time of manufacture to have substantially equal sensitivities; and
the processor is configured to:
detect degradation in microphone performance as a mismatch in sensitivities of any of the two or more microphones of the microphone set; and
compare a detected change in sensitivities of any of the two or more microphones of the microphone set to a predetermined sensitivity threshold.

6. The device of claim 5, wherein the processor is configured to compare a detected change in sensitivities of any of the two or more microphones of the microphone set to a predetermined sensitivity threshold.

7. The device of claim 1, wherein the processor is configured to automatically compensate for microphone sensitivity drift of the two or more microphones of the microphone set when operating in the directional mode.

8. The device of claim 7, wherein the processor is configured to detect degradation in performance of any microphone of the microphone set in response to an inability to automatically compensate for the microphone sensitivity drift.

9. The device of claim 1, wherein the processor is configured to generate an audible alert in response to detecting degradation in performance of any microphone of the microphone set.

10. The device of claim 1, wherein the processor is configured to generate an alert signal in response to detecting degradation in performance of any microphone of the microphone set and communicate the alert signal to an external electronic device configured to communicatively couple to the ear-worn electronic device.

11. The device of claim 1, wherein the ear-worn electronic device comprises a hearing aid.

12. An ear-worn electronic device configured to be worn by a wearer, comprising:
a housing configured to be supported by, at, in or on an ear of the wearer;
electronic circuitry disposed in the housing and comprising a processor, a radio frequency transceiver, a power source, and a receiver or a speaker;
an antenna disposed in, on, or extending from the housing and operably coupled to the transceiver; and
a first microphone and a second microphone respectively disposed in or on the housing and operatively coupled to the electronic circuitry;
wherein the processor is configured to:
operate the first and second microphones in a directional mode;
detect degradation in performance of the first and second microphones; and
switch from the directional mode to an omnidirectional mode using the non-degraded first or second microphone.

13. The device of claim 12, wherein:
the first and second microphones are microphones calibrated at the time of manufacture to have substantially equal sensitivities; and
the processor is configured to detect degradation in microphone performance as a mismatch in sensitivities of the first and second microphones.

14. The device of claim 13, wherein the processor is configured to compare a detected change in sensitivities of the first and second microphones to a predetermined sensitivity threshold.

15. The device of claim 13, wherein the processor is configured to automatically compensate for microphone sensitivity drift of the first and second microphones when operating in the directional mode.

16. The device of claim 15, wherein the processor is configured to detect degradation in performance of the first and second microphones in response to an inability to automatically compensate for the microphone sensitivity drift.

17. The device of claim 12, wherein the processor is configured to generate an audible alert in response to detecting degradation in performance of the first microphone or the second microphone.

18. The device of claim 12, wherein the processor is configured to:
generate an alert signal in response to detecting degradation in performance of the first microphone or the second microphone; and
communicate the alert signal to an external electronic device configured to communicatively couple to the ear-worn electronic device.

19. The device of claim 12, wherein the ear-worn electronic device comprises a hearing aid.

20. A method implemented by an ear-worn electronic device worn by a wearer, comprising:
operating a set of two or more microphones of the ear-worn electronic device in a directional mode;
detecting degradation in performance of any microphone of the microphone set; and
switching microphone operation from the directional mode to a safe mode using at least one non-degraded microphone of the microphone set in response to detecting the microphone performance degradation.

21. The method of claim 20, wherein the safe mode is an omnidirectional mode and the method comprises:
operating first and second microphones of the microphone set in the directional mode;
detecting degradation in performance of the first and second microphones; and
switching from the directional mode to the omnidirectional mode using the non-degraded first or second microphone.

22. The method of claim 20, wherein the safe mode is:
a mode that provides a sound quality higher than that provided by the directional mode that uses one or more degraded microphones of the microphone set;
an omnidirectional mode that uses the at least one non-degraded microphone of the microphone set; or
a second directional mode that uses at least two non-degraded microphones of the microphone set.

23. The method of claim 20, wherein:
the two or more microphones of the microphone set are microphones calibrated at the time of manufacture to have substantially equal sensitivities; and
the method comprises:
detecting degradation in microphone performance as a mismatch in sensitivities of any of the two or more microphones of the microphone set; and
comparing a detected change in sensitivities of any of the two or more microphones of the microphone set to a predetermined sensitivity threshold.

24. The method of claim 20, comprising:
automatically compensating for microphone sensitivity drift of the two or more microphones of the microphone set when operating in the directional mode; and
detecting degradation in performance of any microphone of the microphone set in response to an inability to automatically compensate for the microphone sensitivity drift.

25. The method of claim 20, comprising generating an audible alert or an alert signal in response to detecting degradation in performance of the first and second microphones.

* * * * *